US010900891B2

(12) United States Patent
Malanoski et al.

(10) Patent No.: US 10,900,891 B2
(45) Date of Patent: Jan. 26, 2021

(54) ANALYZING REFLECTANCE BASED COLOR CHANGES IN SENSING APPLICATIONS

(71) Applicant: The Government of the United States of America, as represented by the Secretary of the Navy, Arlington, VA (US)

(72) Inventors: Anthony P. Malanoski, Washington, DC (US); Brandy J. White, Washington, DC (US); Jeffrey S. Erickson, Washington, DC (US); David A. Stenger, Annapolis, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 15/607,475

(22) Filed: May 27, 2017

(65) Prior Publication Data
US 2017/0343471 A1    Nov. 30, 2017

Related U.S. Application Data

(60) Provisional application No. 62/342,827, filed on May 27, 2016.

(51) Int. Cl.
*G01N 21/31* (2006.01)
*G01N 21/78* (2006.01)
(Continued)

(52) U.S. Cl.
CPC .............. *G01N 21/31* (2013.01); *G01N 21/55* (2013.01); *G01N 21/78* (2013.01); *G06F 3/147* (2013.01);
(Continued)

(58) Field of Classification Search
CPC ..................................................... G01N 21/31
(Continued)

(56) References Cited

U.S. PATENT DOCUMENTS

| 2003/0081214 A1* | 5/2003 | Mestha ..................... G01J 3/46 356/402 |
| 2004/0111021 A1* | 6/2004 | Olson ................ A61B 5/04011 600/407 |

(Continued)

FOREIGN PATENT DOCUMENTS

| WO | WO-2015-095882 A1 | 6/2015 |
| WO | WO-2015-157691 A1 | 10/2015 |

OTHER PUBLICATIONS

International Search Report for PCT/US17/34878 from the International Searching Authority, dated Nov. 30, 2017.
(Continued)

*Primary Examiner* — Tarifur R Chowdhury
*Assistant Examiner* — Omar H Nixon
(74) *Attorney, Agent, or Firm* — U.S. Naval Research Laboratory; William Ladd

(57) ABSTRACT

Systems and methods are provided for identification of a detection event relevant in applications focused on real-time or near real-time reporting in a continuous monitoring application. A controller collects data from a plurality of sensors and compares recent data to background data to determine whether an event has occurred. A system in accordance with an embodiment of the present disclosure is considered to have detected an event of interest when at least a specified minimum number of sensors report a detection event at the same time.

18 Claims, 18 Drawing Sheets

(51) Int. Cl.
*G01N 21/55* (2014.01)
*G06F 3/147* (2006.01)
*G06F 17/18* (2006.01)
*G01N 21/77* (2006.01)

(52) U.S. Cl.
CPC ..... *G06F 17/18* (2013.01); *G01N 2021/7793* (2013.01)

(58) Field of Classification Search
USPC .......................................................... 356/402
See application file for complete search history.

(56) References Cited

U.S. PATENT DOCUMENTS

| | | | | |
|---|---|---|---|---|
| 2005/0232147 | A1* | 10/2005 | Bang | H04L 1/1887 370/229 |
| 2009/0220263 | A1* | 9/2009 | Murayama | G03G 15/0194 399/49 |
| 2010/0114528 | A1* | 5/2010 | Schipperijn | E21B 47/00 702/182 |
| 2010/0214408 | A1* | 8/2010 | McClure | G08B 13/1961 348/143 |
| 2011/0045515 | A1* | 2/2011 | Bell | C12Q 1/37 435/15 |
| 2011/0282613 | A1 | 11/2011 | Skinner et al. | |
| 2012/0154832 | A1* | 6/2012 | Yokoyama | H04N 1/6033 358/1.9 |
| 2013/0005044 | A1 | 1/2013 | Boss et al. | |
| 2013/0058662 | A1* | 3/2013 | Nomura | G03G 15/55 399/15 |
| 2013/0106305 | A1* | 5/2013 | Whitaker | G05F 3/02 315/210 |
| 2013/0177031 | A1* | 7/2013 | Almeida | H01S 3/06754 372/6 |
| 2014/0226192 | A1* | 8/2014 | Takemura | G03G 15/5062 358/504 |
| 2014/0339309 | A1 | 11/2014 | Gao | |
| 2015/0260695 | A1* | 9/2015 | Spartz | G01N 30/74 250/339.01 |
| 2016/0171653 | A1* | 6/2016 | Mendlovic | G01J 3/26 348/280 |

OTHER PUBLICATIONS

Written Opinion of the International Searching Authority for PCT/US17/34878 from the International Searching Authority, dated Nov. 30, 2017.

International Preliminary Report on Patentability for PCT/US17/34878 from the International Searching Authority, dated Nov. 27, 2018.

\* cited by examiner

ANALYZING REFLECTANCE BASED COLOR CHANGES IN SENSING APPLICATIONS

CROSS REFERENCE TO RELATED APPLICATIONS

This application claims the benefit of U.S. Provisional Patent Application No. 62/342,827, filed on May 27, 2016, which is incorporated by reference herein in its entirety.

FIELD OF THE DISCLOSURE

This disclosure relates to sensor systems, including optical sensor systems.

BACKGROUND

Over the past decade, substantial progress has been made towards the realization of autonomous, distributed wireless sensor networks. In particular, off-the-shelf, low power, coin-sized, embedded radio communication systems have recently been used to form fault-tolerant, wireless meshes (~100 per km2) of microelectromechanical (MEMS) sensors for measuring physical qualities such temperature and proximity. Miniaturized portable systems using sensor networks can require specialized approaches to handle data for minimal power and hardware requirements. A need exists for flexible chemical sensing platform that scales in size, cost, and power consumption to the enabling communication systems for distributed applications.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1A:
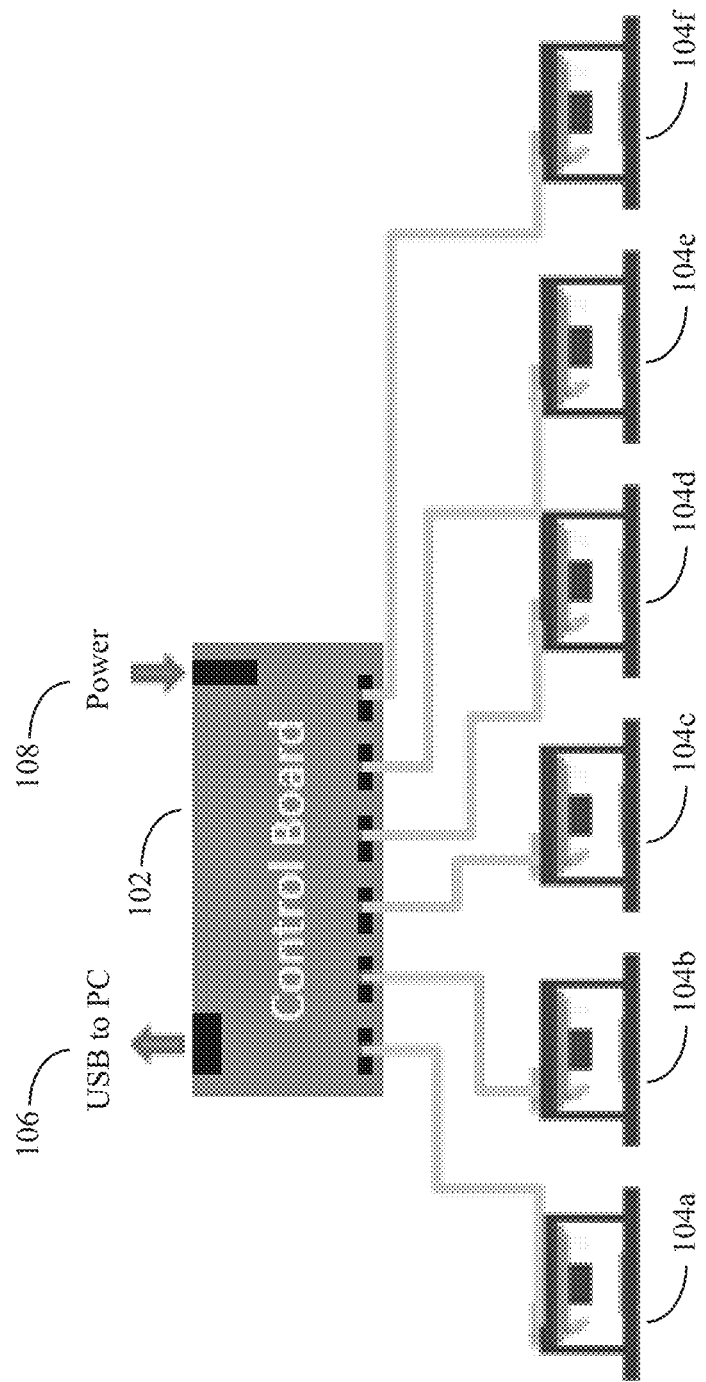
FIG. 1A is a diagram of a system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, unless the content clearly dictates otherwise, the term "porphyrin" or "porphyrins" also includes metalloporphorins.

1. Overview

Embodiments of the present disclosure provide systems and methods for identification of a detection event relevant in applications focused on real-time or near real-time reporting in a continuous monitoring application. For example, embodiments of the present disclosure can be used to enable real-time detection of threats suitable for use onboard. autonomous or portable sensor systems. Other embodiments include long term, autonomous, environmental monitoring (indoor or outdoor), wearable sensor, and air quality monitoring embodiments. Systems and methods according to embodiments of the present disclosure further provide data handling methods for using portable color reporting hardware in autonomous sensing applications.

FIG. 1A is a diagram of a system in accordance with an embodiment of the present disclosure. FIG. 1A includes a controller 102 (e.g., a controller device) coupled to a plurality of sensors 104 (e.g., sensor devices). In an embodiment, sensors 104 are color sensors. In FIG. 1A, controller 102 includes a USB port 106 and a power port 108. Although six sensors are shown in FIG. 1A, it should be understood that embodiments of the present disclosure can include any number of sensors (e.g., 3). Controller 102 can be implemented using hardware, software, and/or a combination of hardware and software. For example, in an embodiment, controller 102 can be a control board. Controller 102 can be implemented as a standalone device or as part of a host device.

In an embodiment, a sensor 104 (e.g., a color sensor) can include one or more light sources (such as one or more light-emitting diodes), at least one sensor (such as a photodiode), and can further include one or more lenses and/or fitters. In embodiments, color sensors report RUB (red, green, blue) color values directly, without involvement of photography or other form of image capture, such as scanning. In an embodiment, the use of color sensors instead of image capture eliminates the need for image processing.

Figure 1B:
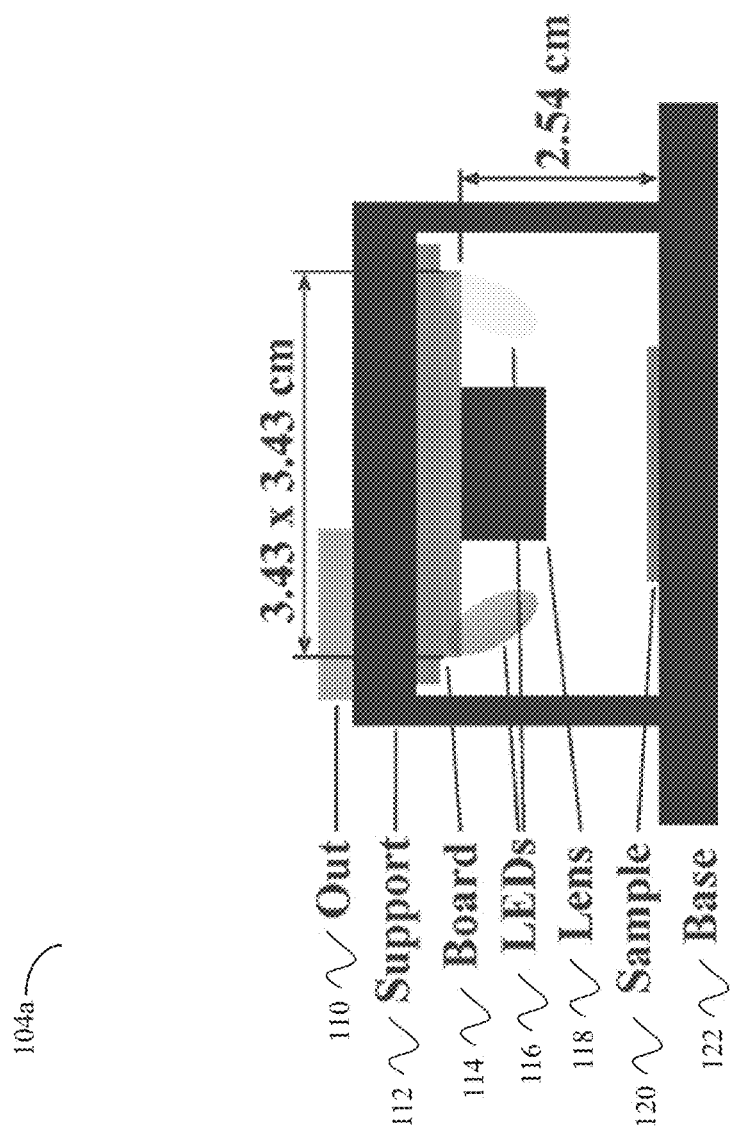
FIG. 1B is a more detailed diagram of a sensor shown in FIG. 1A in accordance with an embodiment of the present disclosure.

FIG. 1B is a more detailed diagram of a sensor 104a shown in FIG. 1A (e.g., sensor 104a) in accordance with an embodiment of the present disclosure. As shown in FIG. 1B, sensor 104a includes an output 110 to controller 102, a support 112, a circuit board 114, one or more LEDs 116, a lens 118, a sample holder 120, and a base 122. In an embodiment, sample holder 120 is used to mount an indicator used to detect data in the environment.

Suitable indicator materials include porphyrin and/or metalloporphyrin on a support (for example, a paper or fabric support used as sample holder 120). Exemplary porphyrins useful in indicator materials include meso-tetra(4-carboxyphenyl) porphine ($C_4TPP$; CAS 14609-54-2); 5-mono(4-carboxyphenyl)-10,15,20-triphenyl porphine ($C_1TPP$; CAS 95051-10-8); meso-tri(4-sulfonatophenyl)mono(4-carboxyphenyl) porphine ($C_1S_3TPP$; no CAS available); deuteroporphyrin IX bis ethyleneglycol (DIX; CAS 623946-72-5); and meso-tetra(4-aminophenyl) porphine ($N_4TPP$), and their metalloporphyrin derivatives.

In an embodiment, the interaction of indicator material and target results in a change in the $\pi$-bond conformation of the porphyrin, yielding a change in the spectrophotometric characteristics of the porphyrin, measurable by a color sensor.

Embodiments of the present disclosure include an array of multiple indicator materials, optionally including multiple individual copies of a particular material. Typically, each individual indicator material is arranged so that is scanned by a single sensor 104. In embodiments, color sensors scan indicator materials at a desired sampling interval, thus providing a data stream that is essentially continuous. The sampling interval may be as short as two seconds or as long as several minutes or even hours.

In an embodiment, the approach to data processing can be tiered, first capturing all significant changes in intensity so that only data from potentially significant events need be sent or processed by higher tiers of data analysis. A potentially significant event (also termed an event of interest) can be one, for example, in which the data varies substantially from previous data (measured by standard deviation and/or by slope). The second tier would ignore charges not represented by multiple array elements and is used to identify whether detection events are related to compounds in the target library.

In an embodiment, rather than using specific sensors or indicators for each target, embodiments of the present disclosure use semi-specific indicators that are differentially responsive across classes of targets. In an embodiment, the color changes in these porphyrin and metalloporphyrin indicators upon interaction with targets provides the basis of the detection approach. In an embodiment, the use of multiple indicators provides the potential for a unique signature, allowing for identification of targets by class and/or specifically depending on the array of indicators used. Tracking reflectance based color changes allows for the use of low cost commercially available sensor chips.

In an embodiment, data (e.g., red, green, and blue (RGB) color data) is collected (e.g., using sensors 104) and sent to controller 102. In an embodiment, controller 102 can collect data from sensors 104 until sufficient data has been gathered to generate one or more background (initial) windows of data. For example, in an embodiment, controller 102 can collect data from sensors 104 for a predetermined (and, in an embodiment, configurable) period of time. In an embodiment, this predetermined period of time can be a specified time limit (e.g., 10 minutes) or a predetermined number of sample cycles from sensors 104.

In an embodiment, as controller 102 gathers data (or, e.g., after a predetermined amount of data has been gathered), controller 102 can replace and/or correct anomalous (e.g., erroneous) points in the gathered data. For example, in an embodiment, controller 102 can compare incoming data from sensors 104 and can eliminate infrequent electronic noise generated by sensors 104.

In an embodiment, data in the background window(s) can be used as control data, and changes in sensed data can be compared to data in the background window(s) to determined when changes in the environment have occurred. In an embodiment, data in the background window(s) can be used to fix response thresholds to be used with a particular device (e.g., a particular controller 102) and indicator configuration.

In an embodiment, to detect changes in the environment, controller 102 can also gather one or more active window(s) of data. In an embodiment, data in the active window(s) can be used to send information to controller 102 regarding the current state of the environment. Data in the active window(s) can be compared with data in the background window(s) to determine what changes in the environment have occurred. Controller 102 can also gather data in one or more smaller "snap" window(s) to detect data that is even more recent than data in the active window(s). In an embodiment, the active window(s) can be used to capture the typical changes expected for a positive indicator response, and the snap window(s) provide the opportunity for more rapid reporting in case of rapid changes.

For example, in an embodiment, initial detection criteria are based on examination of the red, green, and blue color channels for each indicator. In an embodiment, at the current time point, the standard deviation for each color channel (RGB) of a single indicator is computed using the 12 most recent time points; these values are subsequently divided by the average intensity for the same 12 points. In an embodiment, if this value for all three color channels is greater than 0.00015, or if any two of the values are greater than 0.015, the indicator is considered to have detected a potential event. It should be understood that these values are exemplary only, and that any threshold value(s) can be used for detection of a potential. Further, it should be understood that threshold value(s) can be configurable (e.g., by a user) and can be changed.

Further, as described above, embodiments of the present disclosure can use semi-specific indicators that are differentially responsive across classes of targets. In an embodiment, a system in accordance with an embodiment of the present disclosure (e.g., using six indicators 104 as show in FIG. 1) is considered to have detected an event of interest when at least a specified minimum number (e.g., one, two, three, etc.) of indicators report a detection event at the same time. By requiring responses from more than one indicator before determining that an even has occurred, false positives can be reduced, and the number of targets that can be monitored is increased.

In an embodiment, the size, duration, and/or number of samples in the background, active, and snap window(s) are predetermined and can be configured. For example, in an embodiment, three background windows can be populated to collect 120 data points. In an embodiment, three active windows can be populated with the 20 most recent data points, and three snap windows can be populated with the 10 most recent data points.

Additionally, in an embodiment, all windows (e.g., background, active, and snap) are sliding windows and are continuously updated with new data as time progresses. Thus, in an embodiment, the background window always contains the 120 most recent data points, the active window contains the 20 most recent data points, and the snap window contains the 10 most recent data points (e.g., by dropping each oldest point in the respective arrays and adding a new point at each sample cycle). In an embodiment, the sliding windows eliminate the need for clear down (or blow down) time in the device, eliminate complications due to device drift, and exclude changes in indicators or device performance due to changing humidity or temperature.

Figure 2:
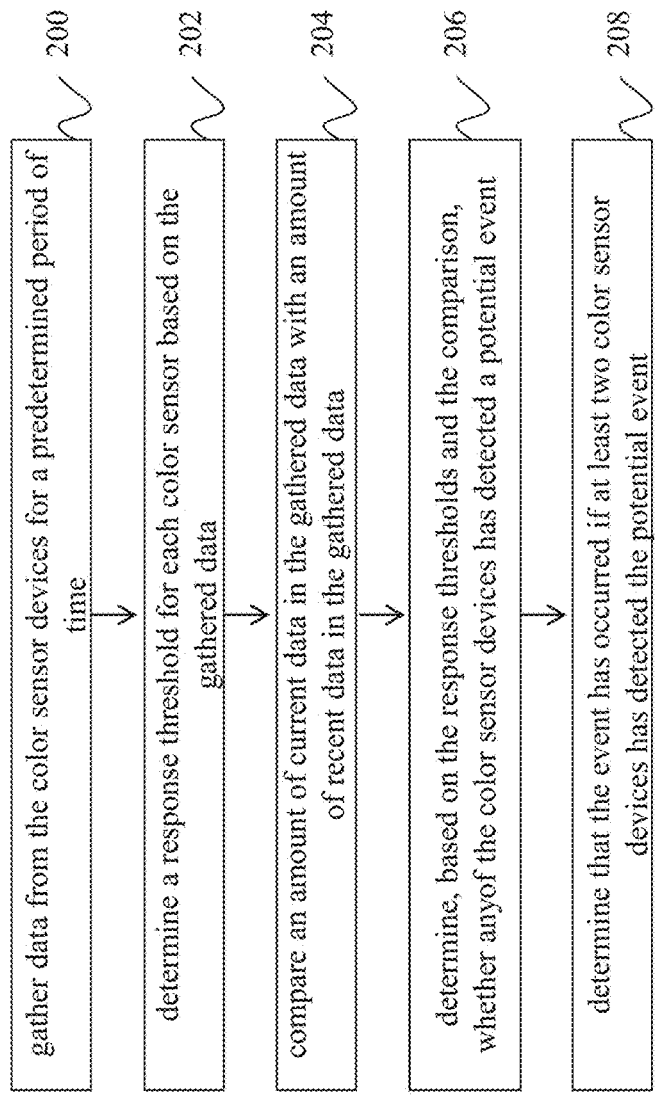
FIG. 2 is a flowchart of a method for analyzing data in accordance with an embodiment of the present disclosure.

FIG. 2 is a flowchart of an exemplary method for analyzing data in accordance with an embodiment of the present disclosure. In step 200, data is gathered (e.g., by controller 102 from sensors 104) for a predetermined period of time. For example, controller 102 can collect data from sensors 104 until controller 102 has collected sufficient data to generate the windows (e.g., until the background window contains the 120 most recent data points, the active window contains the 20 most recent data points, and the snap window contains the 10 most recent data points). In an embodiment, erroneous data in the windows can then be compensated for. For example, controller 102 can compare incoming data from sensors 104 and can eliminate infrequent electronic noise generated by sensors 104.

In step 202, response thresholds are determined for each color sensor based on the gathered data. For example, controller 102 can determine the standard deviations for each color channel (RGB) of each indicator in sensors 104 using the 12 most recent time points and can set a response threshold based on the standard deviations. In step 204, an amount of current data in the gathered data is compared with an amount of recent data in the gathered data. For example, in an embodiment, controller 102 can compare data in an active window or a snap window with data in a background window.

In step 206, controller 102 can determine, based on the response thresholds and the comparison, whether any of the color sensor devices has detected a potential event. For example, controller 102 can determine, based on the determined response thresholds, whether any of sensors 104 has detected an event. In step 208, controller 102 can determine that the event has occurred if at least two (or any specified minimum number) of color sensor devices has detected a potential event at the same time. In an embodiment, if at least 2 indicators in sensors 104 has detected a potential event at the same time, controller 102 can determine that an event has occurred and can report it (e.g., by alerting a user or host device via a message, display, or communication to another device).

It should be understood that controller 102 can determine response thresholds based on data in the background windows (e.g., step 204 in FIG. 2) using a variety of methods. For example, in addition to using a standard deviation method discussed above, controller 102 can use a slope based analysis. In a slope based method, the threshold angle can be fixed for each color value of each indicator based on the first 120 data points. Linear regression values can be used to calculate the slope and $r^2$ values for each color channel over two windows (current and baseline), and the cosine of the angle between the slopes for the baseline and current windows is computed. In an embodiment, if this value is less than the cosine of the threshold angle (above) and the $r^2$ value for the current window is greater than 0.67 (one indicator, 0.57 for more than one indicator), the color value is counted as 1; if the $r^2$ value was greater than 0.8, the color is counted as 2. In an embodiment, counts from all color channels for a given indicator must sum to greater than 1 for the indicator to be considered to have detected a change.

Exemplary standard deviation and slope based techniques for determining whether a potential event has occurred are described in greater detail below. Embodiments of the present disclosure are described in more detail below.

2. Sensor Prototypes

Embodiments of the present disclosure use small, highly portable, autonomous chemical sensors that address gaps in currently available technology. Rather than using specific sensors or indicators for each target or utilizing detailed (and often time consuming) sample analysis for identification of individual targets, embodiments of the present disclosure use semi-specific indicators that are differentially responsive across classes of targets. In an embodiment, the color changes in these porphyrin and metalloporphyrin indicators upon interaction with targets provides the basis of the detection approach. The use of multiple indicators provides the potential for a unique signature, allowing for identification of targets by class and/or specifically depending on the array of indicators used. Tracking reflectance based color changes allows for the use of low cost commercially available sensor chips. In addition to hardware, software, and firmware, embodiments of the present disclosure include algorithm(s) for interpreting the data. In an embodiment, to minimize costs and power requirements, onboard implementation of data interpretation can be implemented on a microcontroller while still providing the necessary specificity and sensitivity.

To understand development of this approach and how it is implemented, it is helpful to understand exemplary prototypes ("PT's") utilized in accordance with embodiments of the present disclosure. In an embodiment, each of the sensor systems control and collect data from six commercially produced RGB color-to-frequency breakout boards. In an embodiment, each device comprises a custom printed circuit board (PCB) to control the hardware, timing, data collection, and to regulate and distribute power. Other components can include sample holders, software interface, and in the case of the PT5 prototype, a housing with fans to provide airflow over the samples.

Regarding indicator materials utilized with the prototypes, in an embodiment, metalloporphyrin constructs were prepared by reflux of the porphyrin with appropriate metal salts. In an embodiment, paper supported porphyrin indicator was prepared using a dip and dry technique. In an embodiment, for a 5×33 cm swatch, 0.4 mM porphyrin in water (total volume 6 mL) was used, and the paper support (WypAll X60) was pulled through this solution and allowed to dry slightly before being pulled through the solution again. In an embodiment, this was repeated until all porphyrin solution had been deposited (typically three cycles), and samples were then dried at 100° C. before storing in the dark in sealed plastic bags. While a number of indicators can be used, the data presented here focuses on the silver complex of meso-tetra (4-aminophenyl) porphine (AgN4TPP; CAS 22112-84-1) for simplicity.

2.1. Sensor Prototype PT3

The PT3 prototype uses flexible cables to connect six of the RGB sensors to a custom circuit board; the RGB sensors are mounted to in-house developed sample holders machined from chemically resistant Delrin plastic. The sample holders are designed to provide a working distance of one inch from sample to sensor using copper spring clips to mount the indicators and are open at the bottom to allow vapor to interact with the target. The Delrin bases are designed to serve as lids for 60 mm Petri dishes. Each RGB sensor has two white LEDs mounted at 45-degree angles to the indicator surface. When activated, each sensor pulses the LEDs for 800 ms, during which the red, green, blue, and clear channels are measured. Integration time for each channel is fixed at 100 ms. Each set of LEDs are on only during the 800 ms interval when the sample is being actively probed in order to minimize any photobleaching as well as power requirements. The six RGB sensors are sampled sequentially (rather than simultaneously) due to limitations in the TCS3200-DB breakout board design; here, one cycle of data is collected in either a 5 s or a 30 s sampling interval. Regardless of the interval, the RGB sensors are activated 800 ms apart, with all six sensors collecting and reporting data 4.8 s into the cycle. On a 5 s sampling interval, the instrument pauses for 200 ms before starting the next cycle; for a 30 s cycle, the instrument pauses for 25.2 s.

RGB measurements collected by the TCS3200-DB breakout boards are converted to a sequence of digital pulses proportional to the intensity values and sent to the PT3 microcontroller. The PT3 board counts the pulses over each 100 ms integration period and stores the results in flash memory. In addition, the microcontroller controls sensor timing and distributes regulated power to the entire system from the USB supplied 5V source. Alternatively, the PT3 can be powered through its DC barrel jack connected to either batteries or a 7.5 V AC/DC adapter.

A custom graphical user interface (GUI) was developed using LabWindows software (National Instruments, Austin, Tex.); this interface communicates with PT3 through simple ASCII commands such as start, stop, unload data stored in firmware, and perform a flash memory erase. The PCB firmware is designed to run continuously once started, stopping only if the flash memory becomes full, the stop command is received, or a manual reset is performed. The firmware sends out data after every measurement cycle, so that if a computer is connected the results can be viewed on the GUI as they are received. The firmware requires no acknowledgement or handshaking during regular operation; it will continue to run even if the computer is disconnected or otherwise not available to receive data.

2.2. Sensor Prototype PT5

The PT5 prototype iteration, like PT3, communicates sequentially with six copies of the TCS3200-DB board. The stock version of this board includes a color sensor (TCS-3200, AMS), an adjustable lens, and two white LEDs. Peak sensitivities for the TCS-3200 sensor occur at 470 nm, 524 nm, and 640 nm. Cool white LEDs, however, tend to have low emission in the red portion of the spectrum, a region of interest for porphyrin-based detection. To enhance instrument sensitivity, one of the white LEDs on each detector board was removed and replaced with a 636-nm red LED rated at 1800 mcd at 20 mA forward current (Lumex, product #SSL-LX5093SIC). The two LEDs were aligned to the center of a target placed 25.4 mm away from the detector board prior to installation in the instrument.

The PT5 platform is designed to run outdoors autonomously for multi-day deployments. The housing is machined from chemically resistant Delrin plastic (McMaster-Carr) and secured with 316-Stainless Steel screws. Black plastic was chosen to minimize stray reflections. Plastic tipped thumb screws seal the top of the instrument for easy access in the field. All of the holes in the housing (cord pass-through; sample airflow) are located on the bottom of the instrument to provide protection from precipitation. The PCB that runs the instrument, the six TCS3200-DB breakout boards, the sample holders, and the two 5V fans that provide 2.7 cfm airflow over the samples are all housed by the enclosure. The PT5 has an upgraded microcontroller providing the possibility for autonomous deployment (no computer necessary) of up to 14 days. PT5 incorporates a real time clock with a quartz crystal. In the PT5, the power and controls for the fans have been incorporated into the PCB. As a result, only one 7.5 V power supply (or set of batteries) is needed to run the instrument. In addition, the fans can be turned on and off by the firmware. The PT5 allows the user to control both the sampling interval and the RGB integration time in software. Sampling interval choices are 5 s and 30 s. The standard 100 ms integration time was available for both sampling intervals. For additional sensitivity, the user can choose 200 ms, 300 ms, 400 ms, or 500 ms integration times when sampling over a 30 s interval. A PC equipped with custom software is used to start and stop each experiment and to download data from the instrument; it is not required to be connected during the experiments.

3. Exposure to Targets

In an embodiment, methods for target exposure depend on the device (e.g., PT3, PT5, etc.) considered. For PT3, indicators were first measured over empty Petri dishes (60 mm diameter). The indicator supports were then moved to a warmed dish (60° C.) containing target providing maximum initial ethanol headspace concentrations of 8, 16, 40, 61, or 82 ppm. Indicator supports were returned to the empty dishes for a minimum of 5 min prior to initiation of another exposure event. This type of exposure provides a brief peak target concentration with ongoing air exchange; reported values are the highest possible concentration based on target volume used. The second type of measurement (e.g., for both PT3 and PT5) provided a single headspace for all indicators and devices. Devices were used for continuous data collection over periods of up to fourteen days encompassing multiple exposure/purge periods. For this measurement, the sensors with mounted indicator materials were placed in a glove chamber (65 L), and the volume was purged with humidified air for establishment of baseline measurements. Exposures were accomplished by adding a fixed volume of target to the continuous air stream to produce maximum ethanol concentrations of 0.05, 0.16, 0.32, 0.53, 1.06, and 1.58 ppm. While other targets have been evaluated, the data presented here focuses on ethanol exposures for simplicity.

4. Data Processing

4.1. Initial Data Screening

The original sensor prototype (PT3) contained an infrequent reporting anomaly that lead to an intensity counter being prematurely dumped; the result is a very low reported value for an individual color channel (R, G, or B on a single sensor). These anomalous data values were excluded in the first round of processing by comparing the channel value to that reported for the previous time point. If the absolute value of the difference between the two divided by the previous value was greater than 35%, the previous value was substituted for the current value. This approach allows for application of the algorithm to live or stored data; all detection algorithms were designed to function in real-time or when applied to stored data.

4.2. Standard Deviation Based Analysis

In an embodiment, initial detection criteria are based on examination of the red, green, and blue color channels for each indicator. In an embodiment, the reported white channel is ignored. At the current time point, the standard deviation for each color channel (RGB) of a single indicator can be computed using the 12 most recent time points; these values can be subsequently divided by the average intensity for the same 12 points. In an embodiment, if this value for all three color channels is greater than 0.00015, or if any two of the values are greater than 0.015, the indicator is considered to have detected a potential event.

In an embodiment, the device (e.g., the system with six indicators shown in FIG. 1) is considered to have detected an event of interest when at least the specified minimum number (e.g., one, two, three, etc.) of indicators report a detection event at the same time. In an embodiment, after event detection, a time window of 30 min is activated. In an embodiment, any simultaneous indicator events that meet the specified minimum within this window are considered part of the initial event. In an embodiment, the window length is extended by 30 min from the last event detected. In an embodiment, following 30 min without event detection, the time stamps for the first and last detected events are reported along with the identification of all indictors that met event detection requirements within the time period.

Figure 3A:
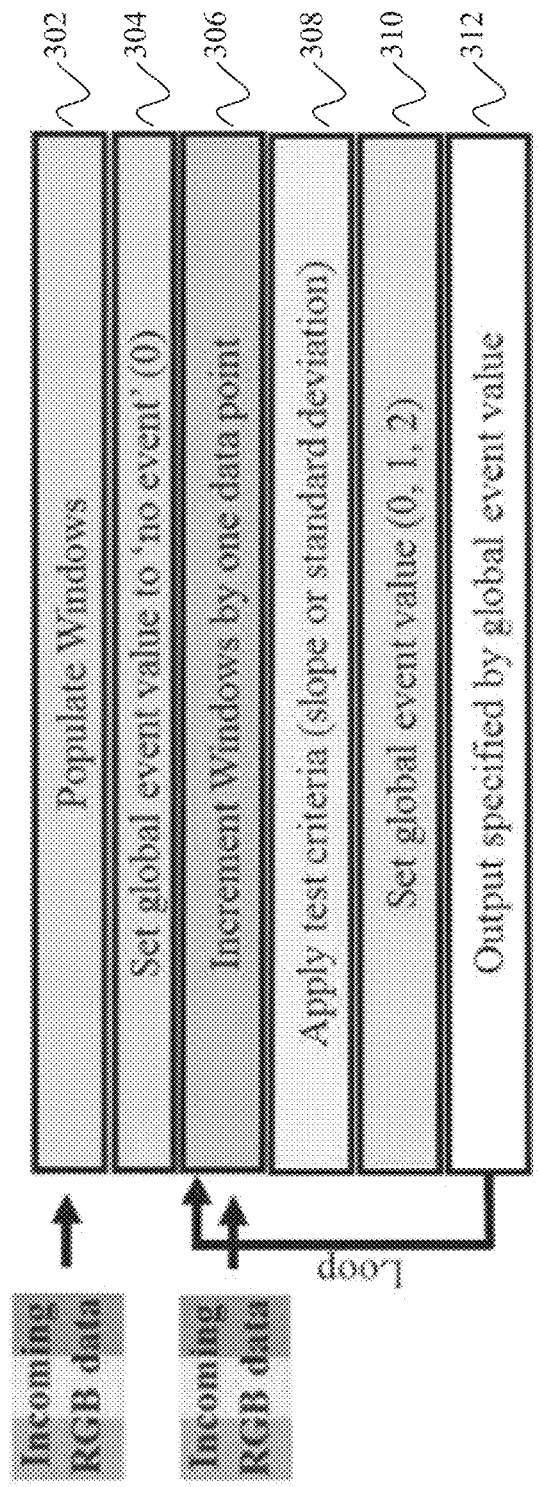
FIGS. 3A-3E are pseudocode diagrams for a standard deviation based algorithm in accordance with an embodiment of the present disclosure.

FIGS. 3A-3E are pseudocode diagrams for an exemplary standard deviation based algorithm in accordance with an embodiment of the present disclosure. Specifically, FIG. 3A provides an overview of the algorithm, and each of FIGS. 3B-3E describes a step shown in FIG. 3A.

For example, in step 302 of FIG. 3A, windows are populated. In step 304, a global event value is set to "no event" (e.g., represented by "0" in an embodiment). In step 306, the windows are incremented by one data point. In step 308, test criteria (e.g., slope or standard deviation) are applied. In step 310, the global event value is set (e.g., to 0, 1, or 2) depending on the results from the test criteria for detecting events. In step 312, the global event value is output.

Figure 3B:
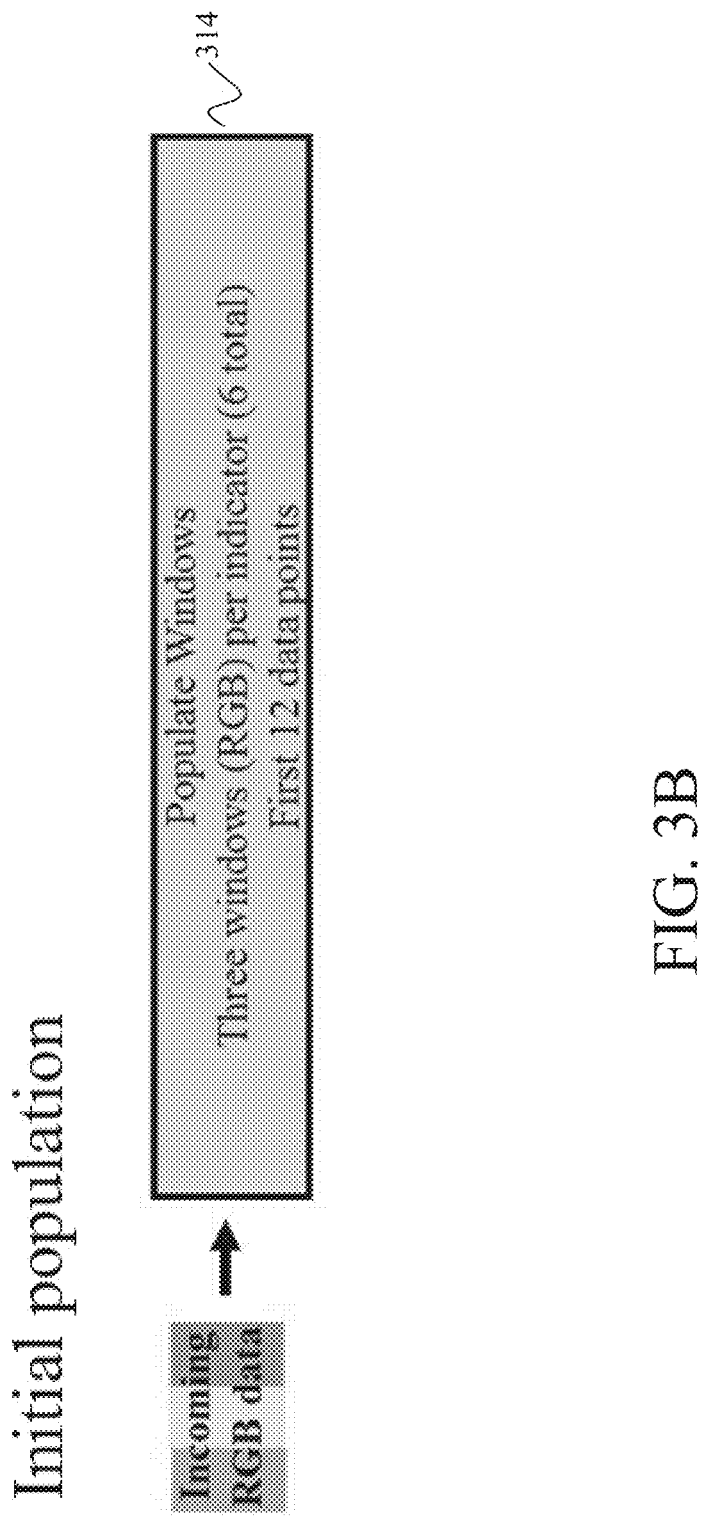

FIG. 3B is a flowchart showing step 302 in further detail for an exemplary standard deviation embodiment. In step 314, to populate the windows, three windows (e.g., RGB) per indicator (e.g., in an embodiment, 6 total indicators for sensors 104) are populated.

Figure 3C:
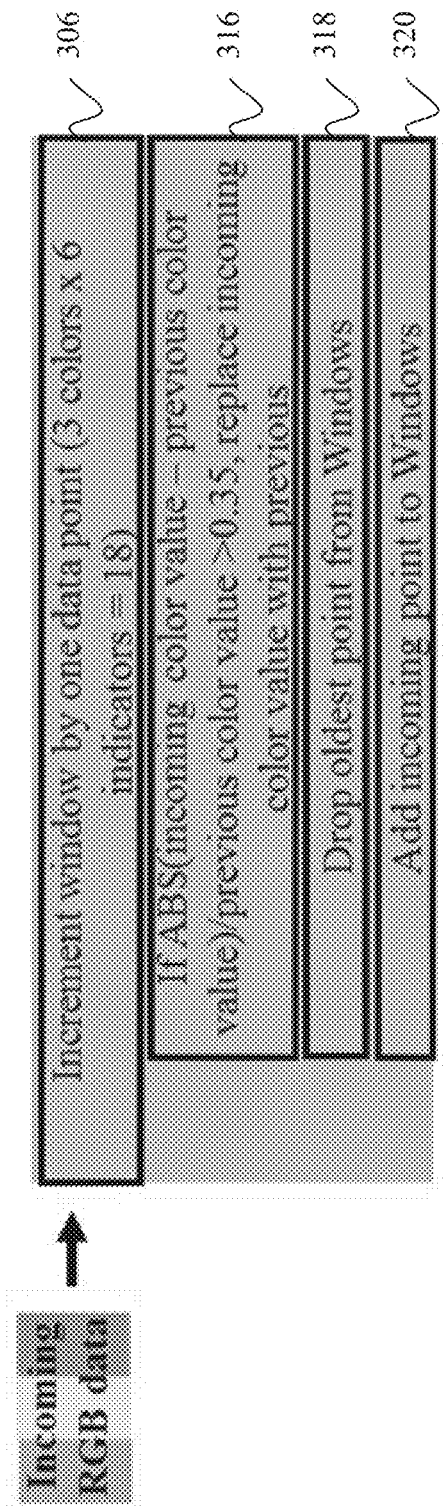

FIG. 3C is a flowchart showing step 306 in further detail for an exemplary standard deviation embodiment. In step 316, if the absolute value of the incoming color value minus the previous color value is greater than 0.35, the incoming color value is replaced with the previous color value. In step 318, the oldest point is dropped from the windows. In step 320, the incoming point is added to the windows.

Figure 3D:
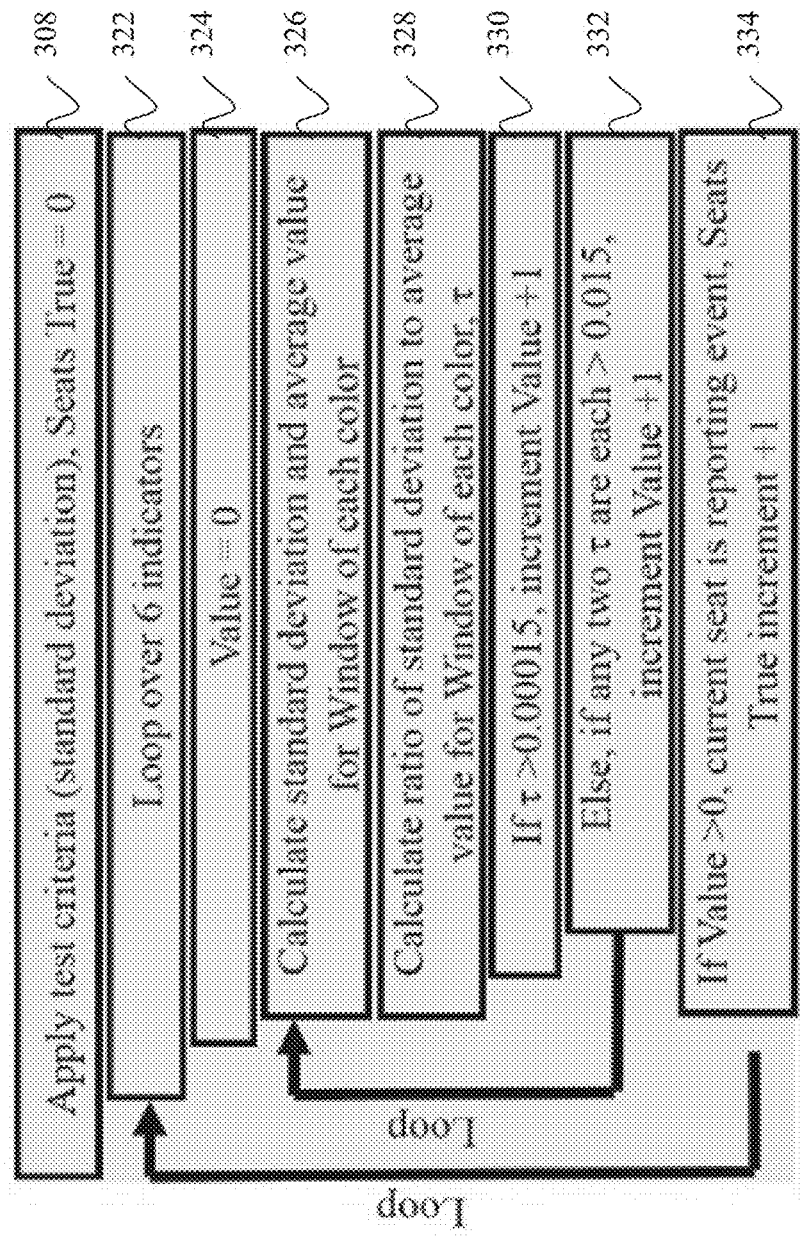

FIG. 3D is a flowchart showing step 308 in greater detail for an exemplary standard deviation embodiment. In step 322, a loop is created over 6 indicators for steps 324-334. In step 324, a value is set to 0. In step 326, the standard deviation and average value for a window of each color is calculated. In step 328, a ratio of standard deviation to average value for the window of each color is calculated. In step 330, if the ratio is greater than 0.00015 the value is incremented. In step 332, if any two ratios are each greater than 0.015, the value is incremented. In step 334, if the value is greater than 0, the current seat is the reporting event, and a "seats true" value is incremented.

Figure 3E:
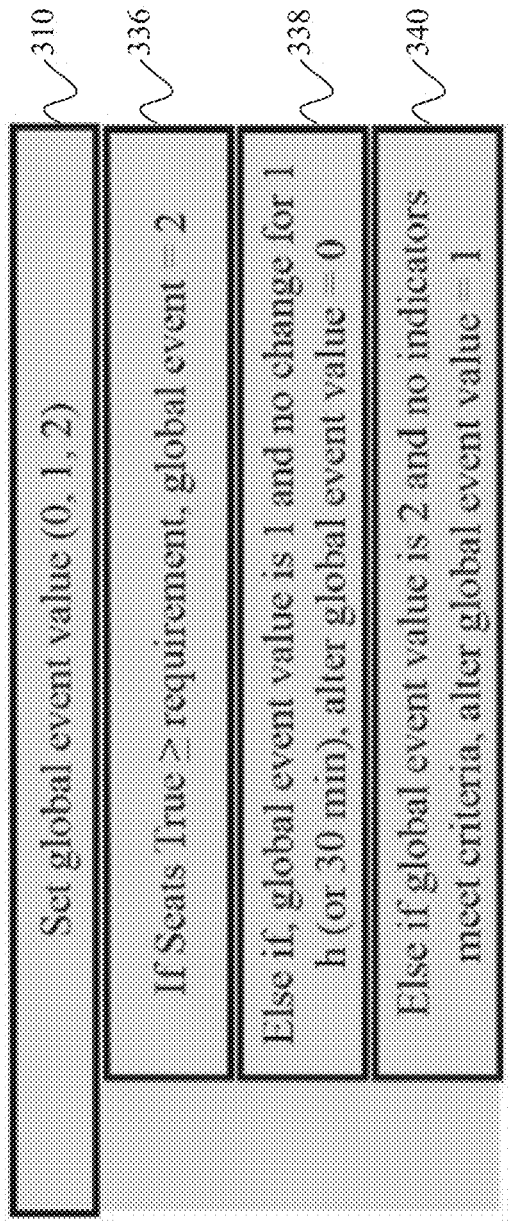

FIG. 3E is a flowchart showing step 310 in greater detail for an exemplary standard deviation embodiment. In step 336, if "seats true" is greater than a requirement, the global event value is set to 2. In step 338, if the global event value is 1 and there is no change for 1 hour (or 30 min in an embodiment), the global event value is set to 0. In step 340, if the global event value is 2 and no indicators meet the criteria, the global event value is set to 1.

4.3. Slope Based Analysis

In a slope based embodiment, the threshold angle is fixed for each color value of each indicator based on the first 120 data points following initiation of the device. The initial intensity for each color is used in the following formula:

$$\emptyset = ae^{\frac{-RGB}{b}} + c \quad \text{(Equation 1)}$$

In Equation 1, RGB is the initial intensity for a color channel. In an embodiment, the parameters used depend on the minimum number of indicators or on the initial intensity values with a=20 (one indicator, 70 for more than one indicator), and b=130 (one indicator, 30 for more than one indicator), and c equal to the larger value of a user specified value (default 0.45°) or the angle of the dot product of the standard deviation calculated for the first 120 data points following initiation of the prototype. Linear regression formulas (least squares) are used to compute the slope and $r^2$ value for each color channel over two windows, current and baseline. The current window comprises the 20 (30 s sampling interval; 10 min) or 50 (5 s sampling interval; 4.2 min) most recent time points; the baseline is a window that comprises the next 120 most recent time points. R-squared ($r^2$) is a statistical measure of how close the data are to the fitted regression line. It is also known as the coefficient of determination, or the coefficient of multiple determination for multiple regression.

In an embodiment, the cosine of the angle between the slopes for the baseline and current windows is computed. In an embodiment, if this value is less than the cosine of the threshold angle (above) and the $r^2$ value for the current window is greater than 0.67 (one indicator, 0.57 for more than one indicator), the color value is counted as 1; if the $r^2$ value was greater than 0.8, the color is counted as 2. In an embodiment, counts from all color channels for a given indicator must sum to greater than 1 for the indicator to be considered to have detected a change. Very high dose exposures can induce changes very rapidly; to address this situation, in an embodiment, an additional test was added that uses only the 10 most recent data points (e.g., Snap Windows in the pseudocode of FIGS. 4A-4B). In an embodiment, if the angle between the computed slope of this window and the reference region slope (Background Windows in pseudocode) is greater than 12 degrees, then the color contributes 1. After these tests have been applied to all indicators, cases in which the number of indicators that have detected changes is greater than or equal to the minimum number specified are considered to have detected an event. Similarly to the standard deviation algorithm, an event window can be used for determination of the end point. In an embodiment, that window is 60 min rather than 30 min. In an embodiment, any indicator events within this window extended the event window by 60 min until no events are detected. The time stamps of the first and last detected events can be reported along with indicator identification for all indicators reporting within the window.

Figure 4A:
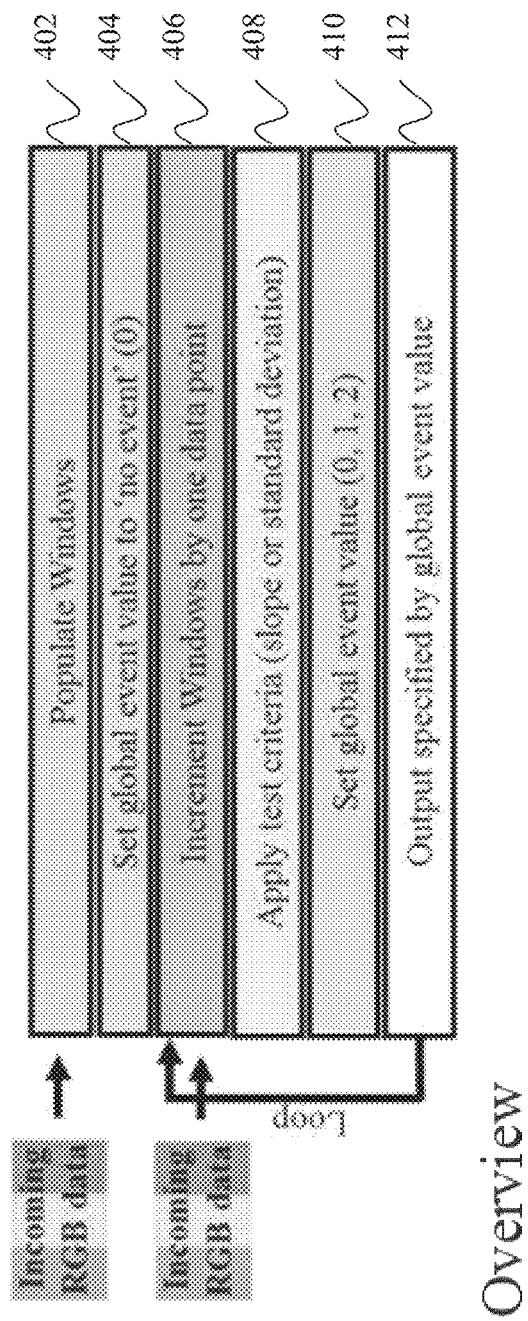
FIGS. 4A-4E are pseudocode diagrams for a slope based algorithm in accordance with an embodiment of the present disclosure.

FIGS. 4A-4E are pseudocode diagrams for an exemplary slope based algorithm in accordance with an embodiment of the present disclosure. Specifically, FIG. 4A provides an overview of the algorithm, and each of FIGS. 4B-4E describes a step shown in FIG. 4A. As shown in FIG. 4A, the steps of FIG. 4A (e.g., steps 402, 404, 406, 408, 410, and 412) correspond to the steps of FIG. 3A. However, as will be discussed below, substeps used to execute these steps changes for a slope based embodiment.

Figure 4B:
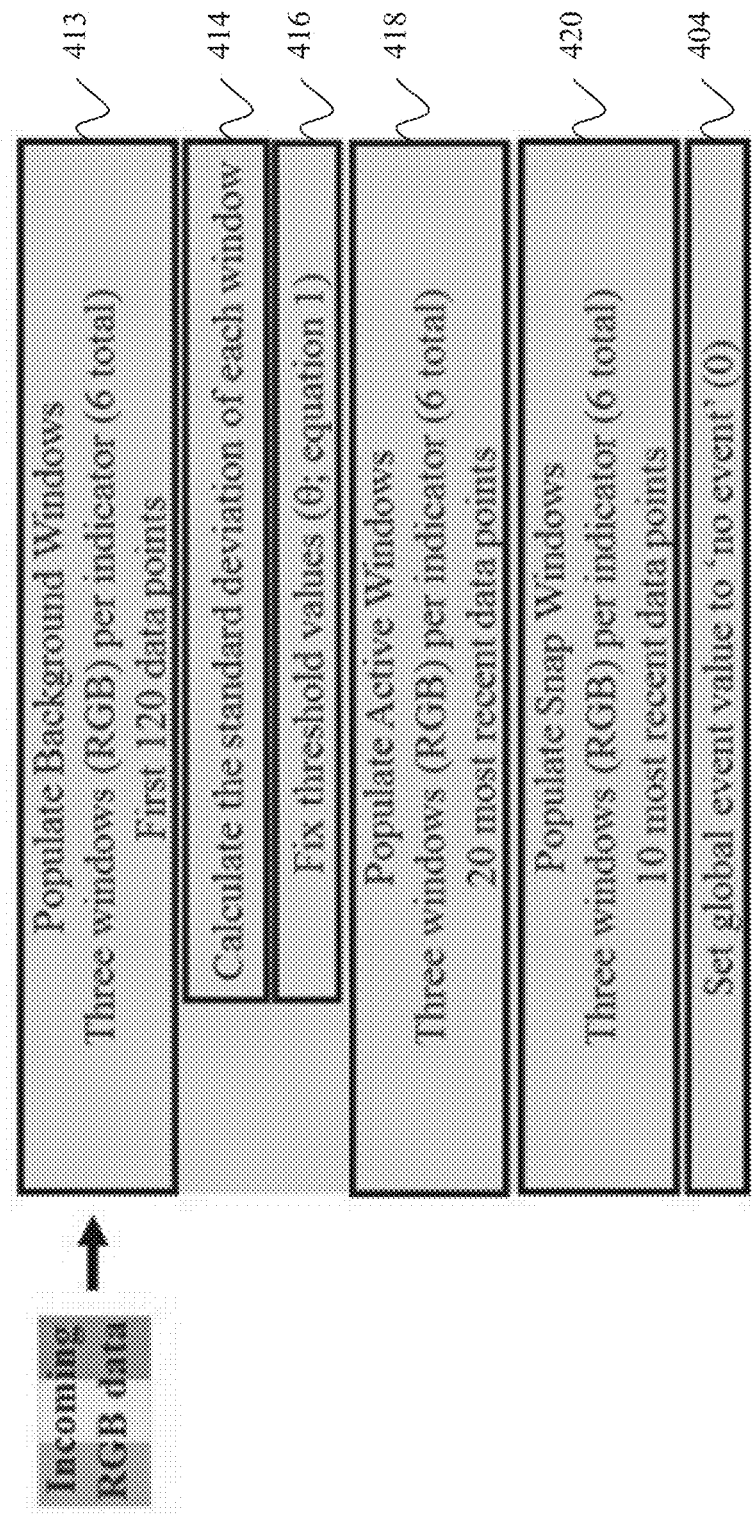

FIG. 4B is a flowchart showing step 402 in greater detail for an exemplary slope based embodiment. In step 413, the background windows are populated. In step 414, the standard deviation of each window is calculated. In step 416, the threshold values are fixed (e.g., using Equation 1). In step 418, the active windows are populated. In step 420, the snap windows are populated. In step 404, the global event value is set to 0.

Figure 4C:
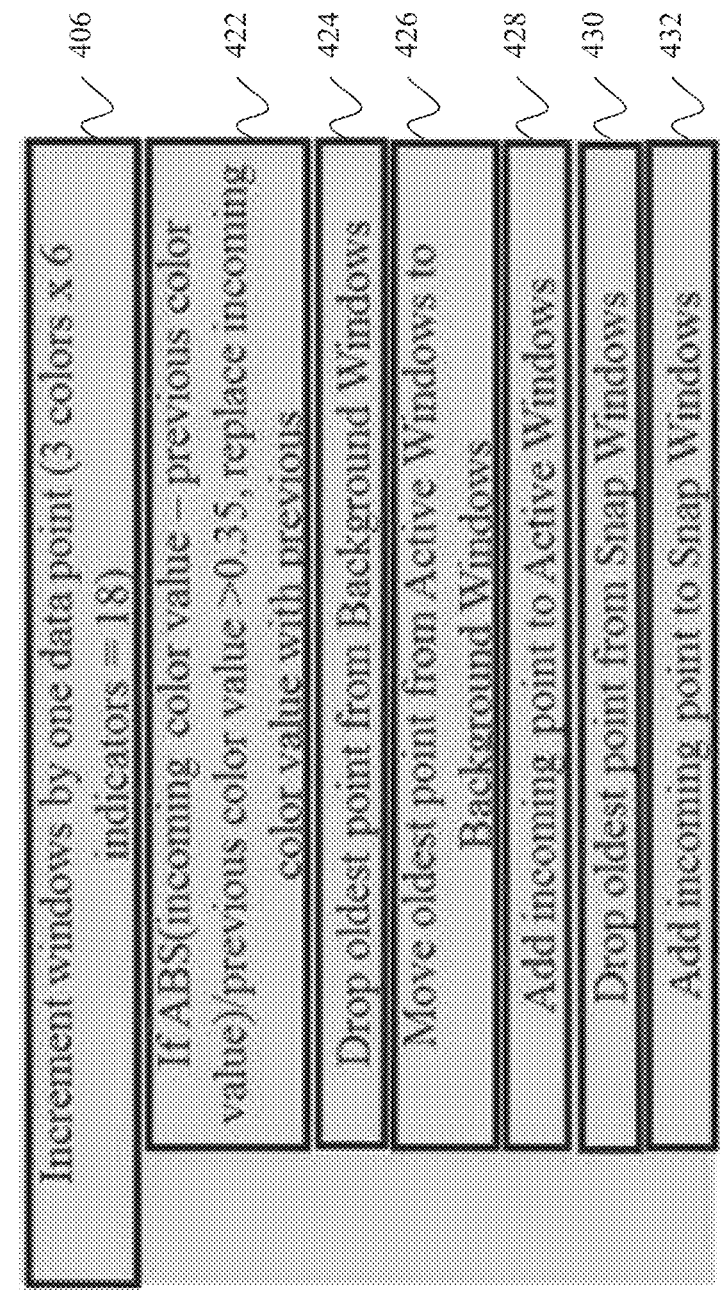

FIG. 4C is a flowchart showing step 406 in greater detail for an exemplary slope based embodiment. In step 422, if the absolute value of the incoming color value minus the previous color value is greater than 0.35, the incoming color value is replaced with the previous color value. In step 424, the oldest point is dropped from the background windows. In step 426, the oldest point is moved from the active windows to the background windows. In step 428, an incoming point is added to the active windows. In step 430, the oldest point is removed from the snap windows. In step 432, an incoming point is added to the snap windows.

Figure 4D:
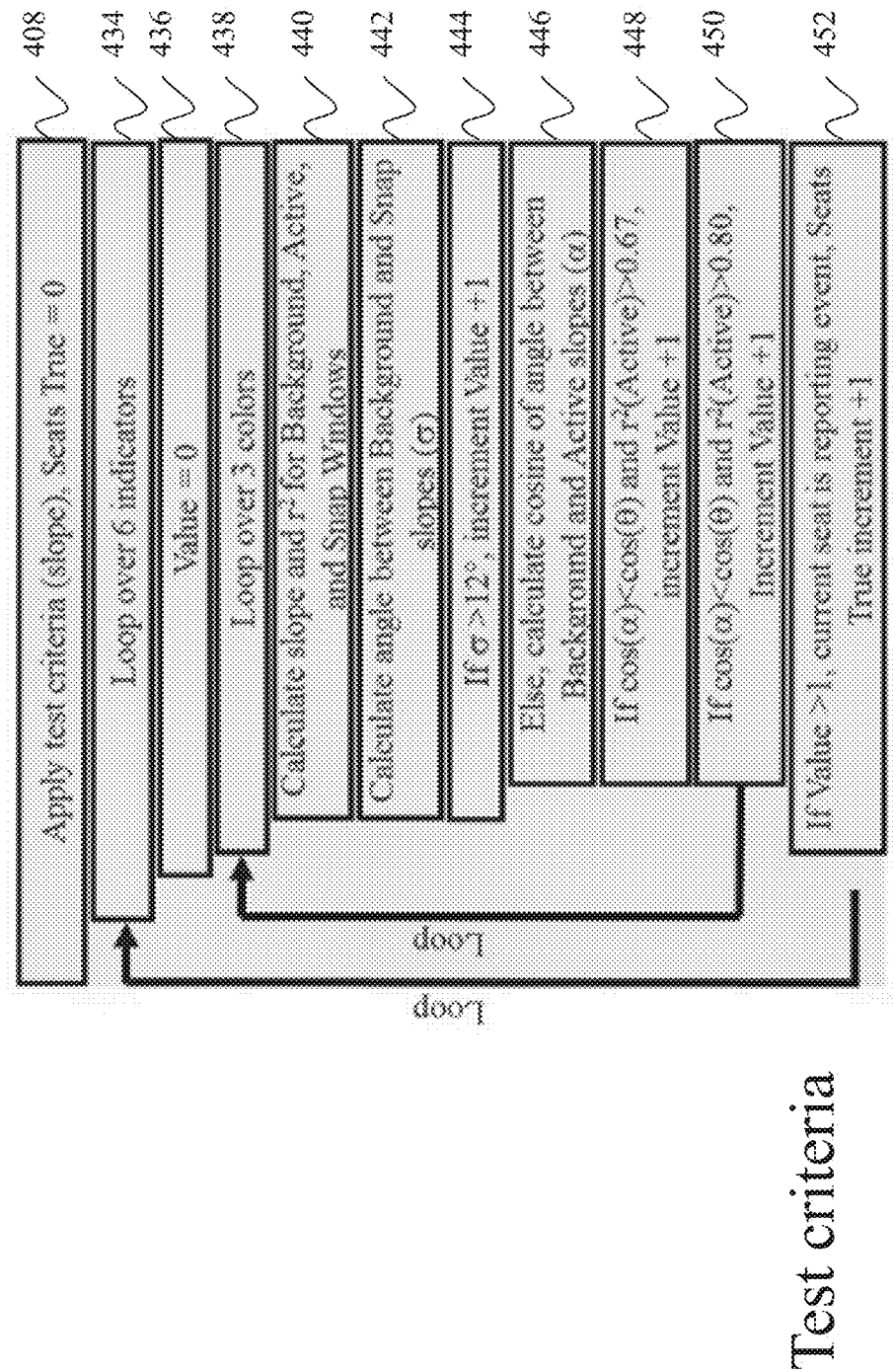

FIG. 4D is a flowchart showing step 408 in greater detail for an exemplary slope based embodiment. In step 434, a loop is created over 6 indicators for steps 436-452. In step 436, a value is set to 0. In step 438, a loop over 3 colors is created for steps 440-450. In step 440, the slope and $r^2$ for background, active, and snap windows is calculated. In step 442, the angle between background and snap slopes ($\sigma$) is calculated. In step 444, if the angle is greater than 12 degrees, the value is incremented. In step 446, if the angle is not greater than 12 degrees, the cosine of the angle between the background and active slopes ($\alpha$) is calculated. In step 448, if the cosine of $\alpha$ is less than the cosine of $\sigma$ and $r^2$ of the active window is greater than 0.67, the value is incremented. In step 450, if the cosine of $\alpha$ is less than the cosine of $\sigma$ and $r^2$ of the active window is greater than 0.80, the value is incremented. In step 452, if the value is greater than 1, the current seat is the reporting event, and "seats true" is incremented.

Figure 4E:
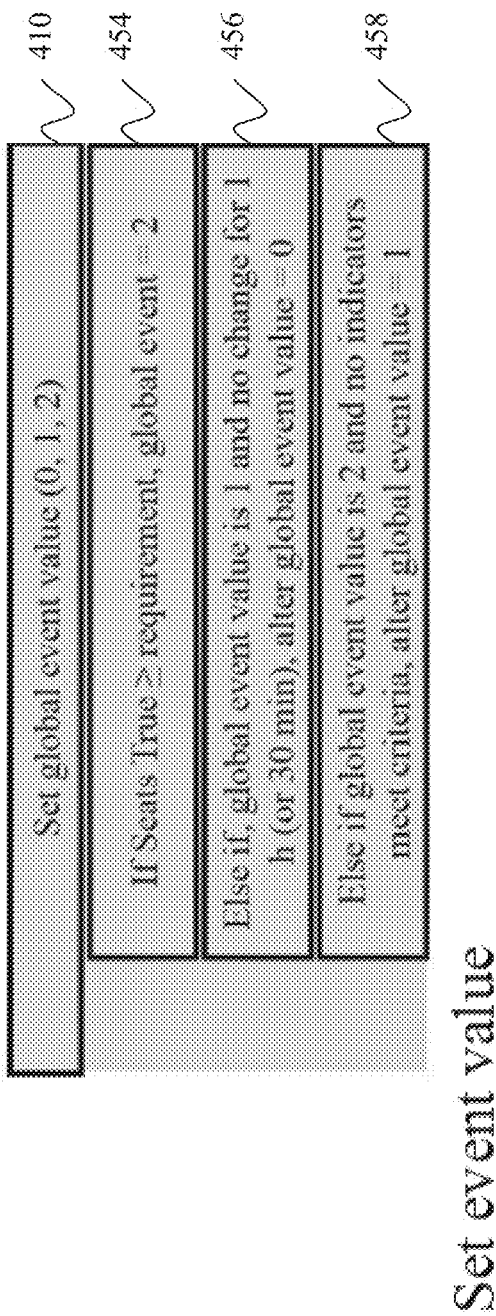

FIG. 4E is a flowchart showing step 410 in greater detail for an exemplary slope based embodiment. In step 454, if "seats true" is greater than a requirement, the global event value is set to 2. In step 456, if the global event value is 1 and there is no change for 1 hour (or 30 min in an embodiment), the global event value is set to 0. In step 458, if the global event value is 2 and no indicators meet the criteria, the global event value is set to 1.

5. Exemplary Application of Data Analysis Approaches

In an embodiment, initial development of a detection algorithm focused on the use of a standard deviation based approach for identification of an event. The work utilized data sets collected with the PT3 prototype applied in Petri dish evaluations for screening of the various porphyrin and metalloporphyrin indicators and included exposures to ethanol, methanol, isopropanol, acetone, acetic acid, and methyl salicylate. For assessment and tuning of the algorithms developed, data sets were generated using a single indicator, silver meso-tetra(4-aminophenyl) porphine (AgN4TPP), with a single target, ethanol. For the PT3 prototype, 180 exposure events at five concentrations were completed in the Petri dish configuration. These evaluations included continuous data collection over periods of up to 8 days, The results reflect those obtained under the original indicator screening effort.

Figure 5:
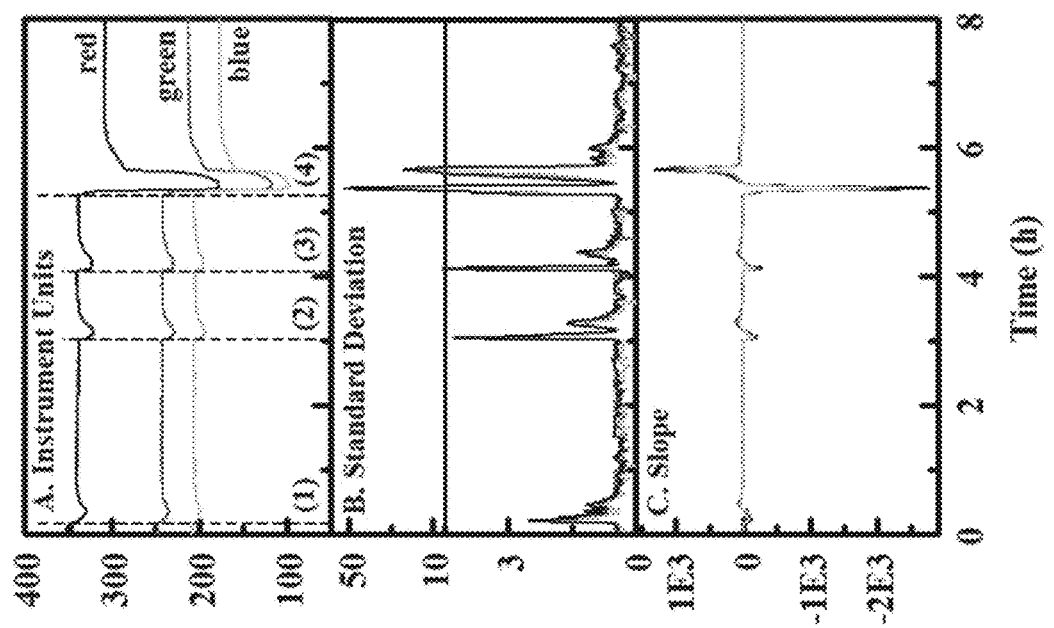
FIG. 5 is a diagram showing representative data for Petri dish exposures of the PT3 prototype along with standard deviation in accordance with an embodiment of the present disclosure.

FIG. 5 is a diagram showing representative data for Petri dish exposures of the PT3 prototype along with standard deviation in accordance with an embodiment of the present disclosure. The algorithm uses changes in the standard deviation of two or more color values for a single indicator to provide identification of an event (s1std). This approach provided the potential for rapid detection (1 min or less) with minimal instrument cycle up time (1 min). In combination with the PT3 prototype and this type of evaluation, the sensitivity (or true positive rate) was 0.87; the specificity was 0.92 for a detection threshold of 8 ppm. Altering the algorithm to require changes on two or more seats (s2std) for event identification lead to a slight improvement in specificity (0.96) and sensitivity (0.93).

PT3 is a bench-scale prototype designed primarily for screening of indicator materials. Petri dish based exposures were effective for identification of indicator array components, assessment of response times, and determination of clear down rates associated with array elements but have little relevance to the environmental sensor system under development. Exposure of the device to targets within an enclosed headspace was intended to provide a better simulation of the intended application conditions. With this approach, target concentrations can be rapidly increased from baseline to the desired level. Return to baseline conditions occurs as the headspace is purged by air flow.

Figure 6:
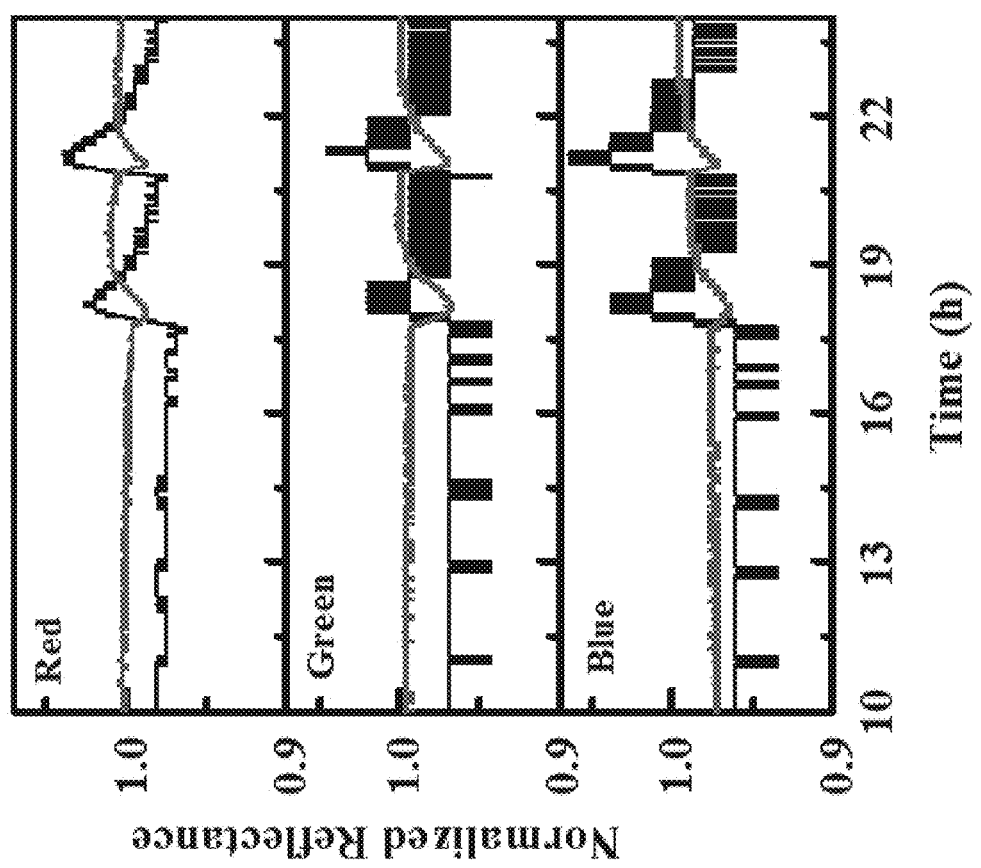
FIG. 6 is a diagram showing representative data for the PT3 prototype in accordance with an embodiment of the present disclosure.
Figure 7:
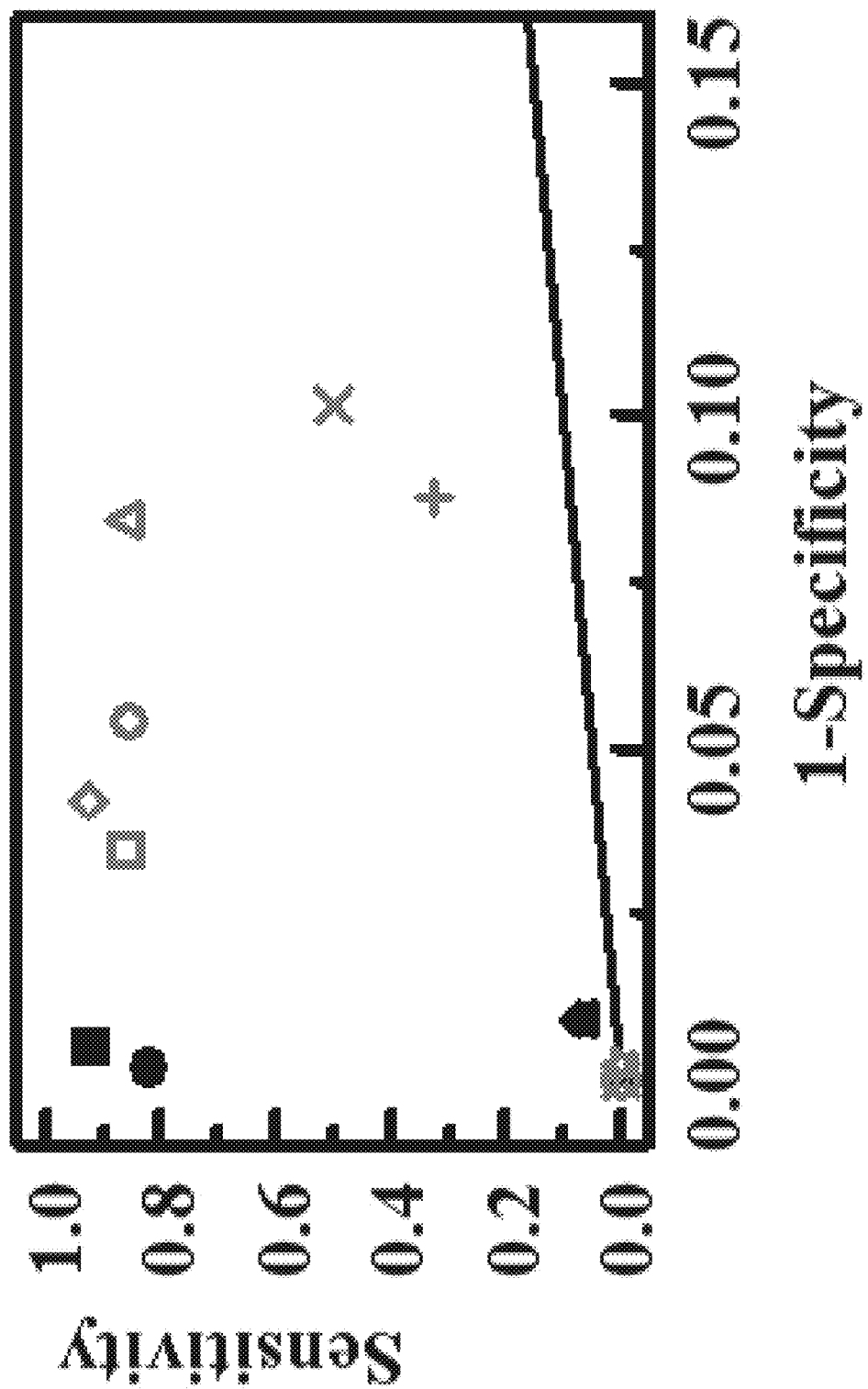
FIG. 7 is a diagram showing receiver operator characteristic (ROC) analysis results for algorithms applied to PT3 data sets in accordance with an embodiment of the present disclosure.

FIG. 6 is a diagram showing representative data for the PT3 prototype in accordance with an embodiment of the present disclosure. In this case, the presented data has been normalized to the average intensity value to facilitate comparisons across devices. The time dependence of the color values reflects the increase to peak concentration, slower than that observed in the Petri dish format, and the slow return to baseline conditions as the air within the enclosure is exchanged. This format allows for interrogation of ethanol concentrations between 50 ppb and 1.6 ppm; 138 exposures of PT3 at five concentrations (0.16 to 1.6 ppm) were completed in this format. When the standard deviation algorithm (s1std) was applied to the resulting data set, the sensitivity was 0.07; the specificity was 0.99 for a detection threshold of 160 ppb. FIG. 7 is a diagram showing receiver operator characteristic (ROC) analysis results for algorithms applied to PT3 data sets in accordance with an embodiment of the present disclosure.

While the standard deviation based algorithm provided poor performance when applied to the PT3 data sets collected in the glove enclosure, manual analysis indicated that the sensor system was capable of providing ethanol detection at even the 160 ppb level. At this point, analysis of data collected using PT5 prototype devices began (four independent, six element devices). The PT5 devices were designed to function autonomously for periods of up to 14 days (30 s sampling increment) after which time the data was manually downloaded. These devices were exposed to targets in parallel with the PT3 device using the glove enclosure procedure. A data set comprising 384 exposures at five concentrations between 0.16 and 1.6 ppm was collected using PT5 (100 ms integration, 5 s interval). Application of the single seat standard deviation based algorithm (s1std) to this data set resulted in a single reported event, a false positive. The dual seat version (s2std) reported no events.

Based on these results, a second algorithm (s1) was developed with detection based on changes in the slope of the color value data. This algorithm provided a sensitivity of 0.50 with specificity at 0.90 for the PT5 data set. When applied to the PT3 data set, sensitivity was dramatically increased over the standard deviation based algorithm (0.82 vs. 0.07) with additional improvement in the specificity (0.998). Interestingly, application of the slope based algorithm to the data set collected using Petri dish exposures resulted in sensitivity 0.86 with specificity 0.95. One contributing factor for the reasons for the variation in algorithm performance was the differences in experimental procedures. The standard deviation based algorithm was more effective for the sharp concentration changes achieved in the Petri dish format but was poorly suited to the slightly more gentle increase in concentration of the glove enclosure experiments. The performance of the two prototype devices leads to some variation as well. The average color value for PT3 is between 391 and 569 for the AgN4TPP indicator depending on the channel (RGB) analyzed (average 466); for PT5, it varies from 113 to 27 (average 56). The standard deviation in the PT3 data is less than 1% of the total signal; for PT5, it is up to 5% depending on the color channel evaluated. These variations are a result of manufacturing differences in the breakout boards used.

Figure 8:
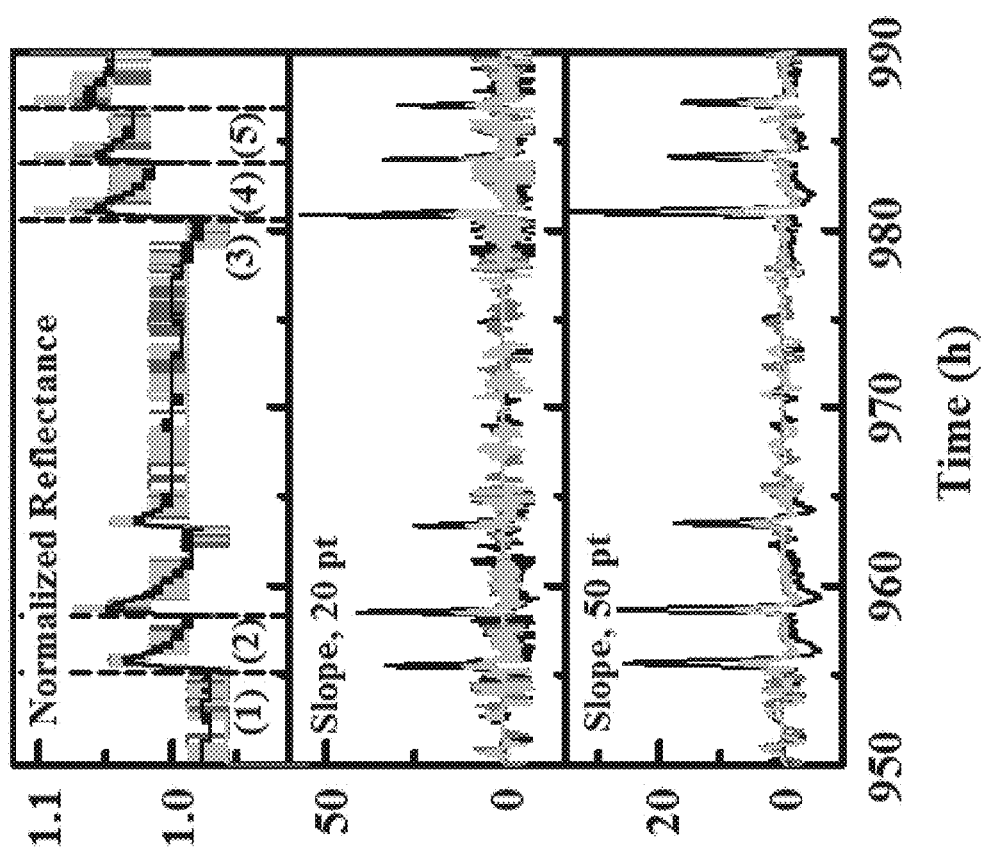
FIG. 8 is a diagram showing a PT5 data interval in accordance with an embodiment of the present disclosure.

To achieve 14 days of autonomous data collection, the PT5 devices use a 30 s sampling increment; the 5 s sampling increment, used for comparison to the PT3 device, provides 60 h of autonomous data collection. FIG. 8 is a diagram showing a PT5 data interval in accordance with an embodiment of the present disclosure. It is desirable to keep the sampled window as short as possible in order to make real-time application of the algorithm possible. With this in mind, the algorithm was adjusted to use 20 points rather than the 50 utilized with the 5 s sampling increment keeping the total time at 10 min. The use of 20 points maintained high sensitivity while introducing few false positives. Application of this variation of the slope based algorithm (s1) yielded a specificity of 0.94 with a significant loss in sensitivity (0.23). A two seat variation of this algorithm (s2) provided somewhat improved sensitivity 0.48 (0.98 specificity). Increasing the concentration limit used from 0.16 to 1.58 ppm provided a sensitivity of 0.88 (for s2; s1 0.61). This sensitivity was still below that sought for the intended application and the concentration threshold is much higher than that desired. Down sampling the PT3 data set to a 30 s interval did not cause these types of losses. PT3 reports significantly higher color values than PT5 (100 ms integration). This result leads to consideration of device performance. It is possible to increase the total signal for the PT5 device through increasing the integration time used; the standard deviation in the signal simultaneously drops. Increasing the integration to 200 ms, increased the average color value to 231 with a standard deviation of 2.8%. At 500 ms integration, the maximum possible at this sampling interval, the average color value was 713 with a standard deviation of 0.7%.

Figure 9:
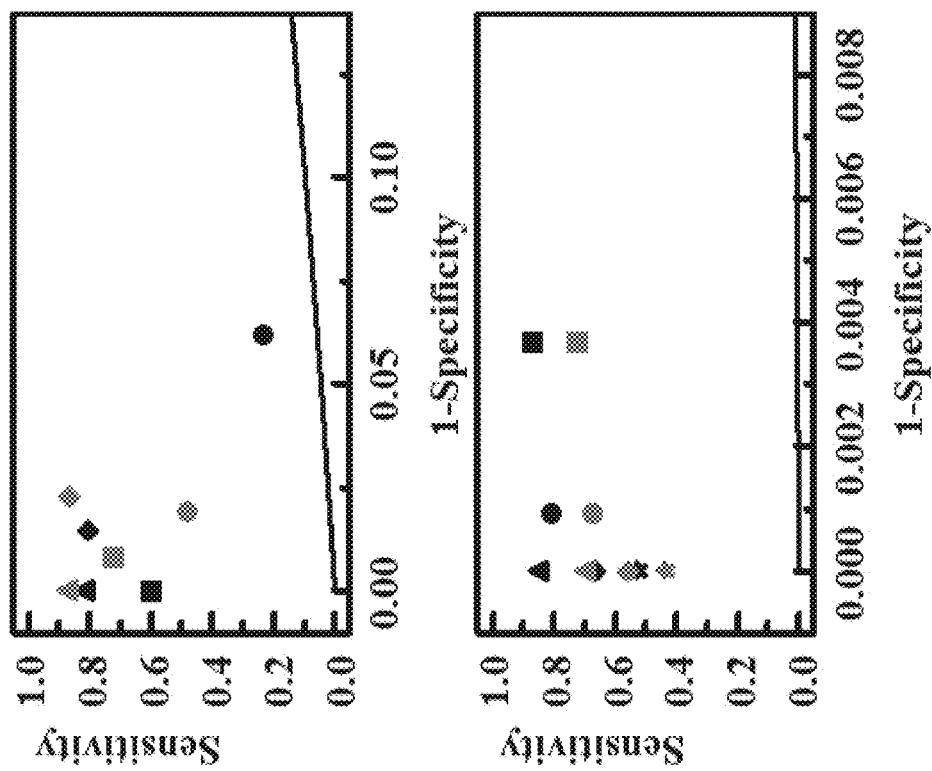
FIG. 9 is a diagram showing ROC analysis for the single (s1) and dual (s2) seat slope based algorithms across four integration times in accordance with an embodiment of the present disclosure.

To evaluate the impact of total signal and noise levels on algorithm performance, PT5 data sets were generated for 200, 400, and 500 ms integration times. These sets consisted of 360 exposures at five concentrations between 0.16 and 1.6 ppm. FIG. 9 is a diagram showing ROC analysis for the single (s1) and dual (s2) seat slope based algorithms across four integration times in accordance with an embodiment of the present disclosure. Increasing integration to 200 ms dramatically improved both sensitivity and selectivity over that observed for the 100 ms data set. Additional improvement was obtained using 400 ms integration. Increasing integration time to 500 ms did not result in additional gains; in fact, a loss in specificity was noted wider both variations of the algorithm.

For further tuning of the algorithm, the 500 ms integration data set was expanded to include 72 exposures at a concentration of 0.05 ppm. This data set was analyzed using the single seat slope based algorithm at a detection threshold of 0.16 ppm as well as 0.05 ppm. The angle threshold for detection was varied at 0.45°, 1.45°, and 2.45°. The dual seat slope based algorithm (0.45°) was applied along with an additional variant of this algorithm using a three seat requirement (0.45°). As shown in FIG. 9, specificity could be increased at the expense of sensitivity through increasing the angle threshold value. The three seat variant of the algorithm using the lowest angle threshold provided the best performance overall, returning no false positives with a sensitivity of 0.85 (0.16 ppm threshold). The 0.05 ppm level exposures were not detected by any of the algorithm variants. If the concentration threshold is shifted to 0.32 ppm, the two seat and three seat variants identify all events with no false positives (sensitivity and specificity both equal 1).

6. Exemplary Implementations

Systems and methods for application to data analysis in a real-time colorimetric sensing approach using reversible indicators have been described. The presented examples demonstrate the flexibility of the approach for accommodating variations in hardware performance as well as changes in desired detection limits and tolerances for false responses, While the approach is suitable to use with typical desktop computing resources, the developed systems and methods use simple function calls that are adaptable to the low processing capabilities used with long term autonomous and portable devices. Similar approaches would be suitable for use in combination with unmanned systems.

In an embodiment, the analysis and results described here used this method and algorithm with implementation in either Perl or Python scripting languages. Perl was used for initial development the shift to Python was intended to provide compatibility with onboard software for an unmanned ground vehicle. The current algorithm has been coded in a manner that is compatible with the more limited resources onboard the sensor device. In theory, the entire algorithm could be executed in real-time on a single microcontroller; the fewer indicators used the easier this will be. In practice, it may be advantageous to add a second microcontroller that functions as a co-processor, possibly with some external RAM. This would free up the main microcontroller for real-time data collection from the sensor, along with the burden of data transfer to the (shared) external RAM. The co-processor would read and process data from the shared external RAM as it becomes available. In an embodiment, the co-processor must be capable of performing floating point operations, including 64-bit division.

The standard deviation based analysis is by far the easier of the two to implement. Memory requirements are very small, so that external RAM is unlikely to be required. Memory should be set up as a ring FIFO. For six indicators with three color channels each, the FIFO would hold 216 data points, each of which is 16 bits in size (=432 bytes in the FIFO). Following the flow chart in FIGS. 3A-3E, 36 separate division steps are required, along with 18 square root calculations. All other operations are computationally simple.

The slope analysis of FIGS. 4A-4E is more difficult to implement. In an embodiment, a ring FIFO would be used to store the data. The required size is 120 data points per color per indicator for the background window, an additional 20 data points for the active and snap windows (for 30 second sampling), and one point for overflow (described below) In an embodiment, all 141 data points are 16-bits in size. To simplify the calculations, it is useful to keep track of running sums. Two of these, the sum of the time increments and the sum of the square of the time increments, are relevant across all channels and need only be recorded once for each of the three windows. This adds three 16-bit and three 32-bit variables to the FIFO. The other three running sums involve color intensity. In an embodiment, three sums are used for each window, and there are three windows per channel. In an embodiment, all of these sums are 64-bits in size. For six indicators with 3 color channels each, the FIFO would hold 51,120 bits=6,390 bytes. In the case of 5-second sampling, the FIFO would be slightly larger, at 59,760 bits=7,470 bytes.

Following the flow chart in FIGS. 4A-4E, it is useful to evaluate the slope and $r^2$ value for each window in each channel, as well as the cosine of the relevant angles. In an embodiment, this is performed with the running sums stored in the FIFO. When each new set of data points are collected, they are screened using the initial data test and then added to the front of the FIFO. Every data point moves back by one place. The overflow data. point described above is the oldest point in the set (point number 141 in a 30 second experiment). In an embodiment, to push it completely out of the FIFO, relevant related quantities are first be subtracted from the running sums. Next, quantities involving the newest data point can be calculated and added to the running sums. Finally, slope, $r^2$, and angle cosines can be computed using these running sums, and relevant tests are applied.

7. Advantages

Here, we describe our efforts focused on development of methods and an associated algorithm for identification of a detection event in real-time sensing applications relying on reporting of color values, for example, reflectance based sensing relevant to reporting in a continuous monitoring application. Exemplary methods described here focus on the identification of event occurrence and utilize an approach suitable to incorporation onboard for a portable, autonomous device. In an embodiment, the described approaches exclude electronic noise generated by the sensor system. Exemplary approaches combine multiple signal channels (RGB), as well as multiple array elements for reporting on an event with a minimum of false responses. Exemplary methods automatically adjust to the overall intensity of the data collected, facilitating use with different device variations as well as accommodating differing indicator behaviors. Exemplary methods reported are applicable to the porphyrin and metalloporphyrin based indicators described but would be equally useful when applied to other colorimetric indicators, including the NRI, developed, porphyrin-modified antimicrobial peptides. Embodiments of the present disclosure are especially suited to reversible indictors, but could be utilized with reactive indicators as well.

8. Exemplary Alternatives

Recent and current efforts in colorimetric sensing rely on post exposure image collection and analysis, often including the use of computing resources or hardware that are not suitable to portable applications. The advantages described here offer the potential for use of colorimetric sensing with real-time event reporting. The described methods and approaches are suitable for use in conjunction with higher tiers of analysis being handled by a centralized processor receiving limited data streams from one or more individual sensors. Higher tiers of analysis with multiple sensor devices could also be used to relate the spatial location of detection events in combination with computational fluid dynamics models.

9. Conclusion

Described herein are systems and methods for identification of a detection event in real-time sensing applications relying on reporting of color values, for example, reflectance based sensing relevant to reporting in a continuous monitoring application. Exemplary methods described herein focus on the identification of event occurrence and utilize an approach suitable to incorporation onboard for a portable, autonomous device. Exemplary described approaches exclude electronic noise generated by the sensor system. Exemplary approaches combine multiple signal channels (RGB) as well as multiple array elements for reporting on an event with a minimum of false responses. Exemplary methods automatically adjust to the overall intensity of the data collected, facilitating use with different device variations as well as accommodating differing indicator behaviors. Exemplary methods reported are applicable to the porphyrin and metalloporphyrin based indicators described but would be equally useful when applied to other colorimetric indicators, including porphyrin-modified antimicrobial peptides. Embodiments of the present disclosure are particularly suited to reversible indictors, but could be utilized with reactive indicators as well.

Exemplary described systems and methods are suitable for use in conjunction with higher tiers of analysis being handled by a centralized processor receiving data streams from one or more individual sensors. Higher tiers of analysis with multiple sensor devices could also be used to relate the spatial location of detection events in combination with computational fluid dynamics models.

It is to be appreciated that the Detailed Description, and not the Abstract, is intended to be used to interpret the claims, The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A sensor system, comprising:
a plurality of color sensor devices; and
a controller device coupled to the plurality of color sensor devices, wherein the controller device is configured to:
  gather data sensed from a surrounding environment from the plurality of color sensor devices for a predetermined period of time,
  generate a background window of the gathered data,
  generate an active window of the gathered data, wherein the active window forms a first predetermined amount of the gathered data, wherein the background window forms the second predetermined amount of the gathered data, and wherein the active window is a subset of, and smaller than, the background window,
  generate a snap window of the gathered data, wherein the snap window forms a third predetermined amount of the gathered data, wherein the snap window is a subset of, and smaller than, the active window,
  determine a response threshold for each color sensor device in the plurality of color sensor devices based on the gathered data,
  compare the third predetermined amount of current data in the gathered data with the second predetermined amount of recent data in the gathered data,
  determine, based on the response thresholds and the comparison between the third predetermined amount of the gathered data and the second predetermined amount of the gathered data, whether any of the color sensor devices in the plurality of color sensor devices has detected a potential event, and
  determine that the potential event has occurred if at least two color sensor devices in the plurality of color sensor devices has detected the potential event.

2. The sensor system of claim 1, wherein the background window, the active window, and the snap window are sliding widows that are continually updated as time progresses.

3. The sensor system of claim 1, wherein the color sensor devices comprise a plurality of indicators that are differentially responsive across classes of targets.

4. The sensor system of claim 1, wherein the controller device is configured to determine the response threshold for each color sensor device using a standard deviation technique.

5. The sensor system of claim 4, wherein the controller device is further configured to:
determine a standard deviation for each color channel of each indicator in each color sensor device in the plurality of color sensor devices.

6. The sensor system of claim 1, wherein the controller device is configured to determine the response threshold for each color sensor device using a slope based technique.

7. The sensor system of claim 6, wherein the controller device is further configured to:
   determine a threshold angle for each color channel of each indicator in each color sensor device in the plurality of color sensor devices.

8. The sensor system of claim 7, wherein the controller device is further configured to:
   determine a slope value and a $r^2$ value for each color channel of each indicator in each color sensor device in the plurality of color sensor devices over two windows.

9. The sensor system of claim 8, wherein the controller device is further configured to:
   determine a cosine of an angle between each slope over the two windows for each color channel of each indicator in each color sensor device in the plurality of color sensor devices.

10. The sensor system of claim 1, wherein the potential event is a change in the environment.

11. A method, comprising:
   gathering, using a controller device, data sensed from a surrounding environment from a plurality of color sensor devices for a predetermined period of time;
   generating, using the controller device, a background window of the gathered data;
   generating, using the controller device, an active window of the gathered data, wherein the active window forms a first predetermined amount of the gathered data, wherein the background window forms the second predetermined amount of the gathered data, and wherein the active window is a subset of, and smaller than, the background window;
   generating, using the controller device, a snap window of the gathered data, wherein the snap window forms a third predetermined amount of the gathered data, wherein the snap window is a subset of, and smaller than, the active window;
   determining, using the controller device, a response threshold for each color sensor device in the plurality of color sensor devices based on the gathered data;
   comparing, using the controller device, the third predetermined amount of current data in the gathered data with the second predetermined amount of recent data in the gathered data;
   determining, using the controller device, whether any of the color sensor devices in the plurality of color sensor devices has detected a potential event based on the response thresholds and the comparison between the third predetermined amount of the gathered data and the second predetermined amount of the gathered data; and
   determining, using the controller device, that the potential event has occurred if at least two color sensor devices in the plurality of color sensor devices has detected the potential event.

12. The method of claim 11, wherein the background window, the active window, and the snap window are sliding widows that are continually updated as time progresses.

13. The method of claim 11, wherein determining the response threshold for each color sensor device comprises determining the response threshold for each color sensor device using a standard deviation technique.

14. The method of claim 11, wherein determining the response threshold for each color sensor device comprises determining the response threshold for each color sensor device using a slope based technique.

15. A sensing device, comprising:
   a plurality of color sensor devices comprising a plurality of indicators that are differentially responsive across classes of targets, wherein the plurality of color sensor devices are configured to measure color data from a surrounding environment, thereby generating measured color data; and
   a controller device coupled to the plurality of color sensor devices, wherein the controller device is configured to:
      receive the measured color data from the plurality of color sensor devices,
      determine a response threshold for each color sensor device in the plurality of color sensor devices based on the measured color data,
      generate a background window of the measured color data,
      generate an active window of the measured color data, wherein the active window is a subset of, and smaller than, the background window,
      compare data in the background window with data in the active window,
      determine, based on the response thresholds and the comparison between the data in the background window with the data in the active window, whether any of the color sensor devices in the plurality of color sensor devices has detected a potential event, and
      determine that the potential event has occurred if at least two color sensor devices in the plurality of color sensor devices has detected the potential event.

16. The sensing device of claim 15, wherein the controller device is further configured to:
   generate a snap window of the measured color data, wherein the snap window is a subset of, and smaller than, the active window;
   compare data in the active window with data in the snap window, and
   determine, based on the response thresholds and the comparison between the data in the active window with the data in the snap window, whether any of the color sensor devices in the plurality of color sensor devices has detected a potential event.

17. The sensing device of claim 16, wherein the background window, the active window, and the snap window are sliding widows that are continually updated as time progresses.

18. The sensing device of claim 15, wherein the plurality of color sensor devices comprise:
   a plurality of red, green, and blue (RGB) sensors; and
   a plurality of light emitting diodes (LEDs), wherein the plurality of color sensor devices are configured to pulse the LEDs to initiate measurements of the color data by the RGB sensors from the surrounding environment.

* * * * *